United States Patent
Huber et al.

(10) Patent No.: US 6,553,039 B1
(45) Date of Patent: Apr. 22, 2003

(54) ELECTRONIC VEHICLE CONTROLLER WITH A DATABUS CAPABILITY

(75) Inventors: Martin Huber, Kornwesthein (DE); Helmar Kuder, Koengen (DE); Thilo Kuehner, Remseck (DE); Peter Lohrmann, Eislingen (DE); Juergen Minuth, Suessen (DE); Werner Preuschoff, Neuhausen (DE); Bernd Saeufferer, Schlierbach (DE); Volker Seefried, Wangen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/288,317

(22) Filed: Apr. 8, 1999

(30) Foreign Application Priority Data

Apr. 8, 1998 (DE) .......................................... 198 15 715

(51) Int. Cl.[7] .............................................. H04L 12/00
(52) U.S. Cl. ....................................... 370/466; 370/467
(58) Field of Search ................................ 370/465, 466, 370/467, 419, 463, 469, 451, 423, 535; 340/426; 701/29

(56) References Cited

U.S. PATENT DOCUMENTS

| 5,801,865 A | * | 9/1998 | Weis et al. .................. 370/466 |
| 5,838,251 A | * | 11/1998 | Brinkmeyer et al. ........ 340/426 |
| 6,006,147 A | * | 12/1999 | Hall et al. ..................... 701/29 |
| 6,067,302 A | * | 5/2000 | Tozuka ......................... 370/464 |
| 6,067,586 A | * | 5/2000 | Ziegler et al. ............... 370/466 |

FOREIGN PATENT DOCUMENTS

| DE | 41 40 803 A1 | 3/1993 |
| DE | 42 29 931 A1 | 3/1994 |
| JP | 2-35843 | 2/1990 |
| JP | 8-328980 | 12/1996 |

* cited by examiner

Primary Examiner—Salvatore Cangialosi
(74) Attorney, Agent, or Firm—Crowell & Moring LLP

(57) ABSTRACT

An electronic vehicle controller has a processor unit and a communication output stage for coupling the controller to a databus. A data protocol device, which is connected between the processor unit and the communication output stage, variably defines the data protocol to be used for a particular data transfer, as a function of protocol control information which is supplied to its input side. The data protocol device may be in the form of hardware or software, and allows flexible data protocol selection even at the end of the controller development process.

11 Claims, 7 Drawing Sheets

ELECTRONIC VEHICLE CONTROLLER WITH A DATABUS CAPABILITY

BACKGROUND AND SUMMARY OF THE INVENTION

This application claims the priority of German patent document 198 15 715.0, filed Apr. 8, 1998, the disclosure of which is expressly incorporated by reference herein.

The invention relates to an electronic vehicle controller which includes a processor unit and a communication output stage for coupling the controller to a databus.

Controllers of the generic type are used in particular in modern automobiles using data networks for the vehicle electronics. In this case, the various electronic controllers used in the automobile are connected to a databus (generally, a so-called CAN bus) for data communication with one another, and potentially with peripheral units. As is normal for electronic data processing, the data interchange is carried out using suitable protocols for the data which, in this specialized field, means the time sequence in which data information is transferred. A controller interchanges data of various types relating to measured values, switch positions etc. with other controllers via communication links, using an associated data protocol. At the same time, if required, it communicates with other components, such as sensors, actuators, display or indicator elements and interfaces to other communication channels, such as mobile radio etc. It is thus necessary to have a plurality of different protocols available in the controller.

Normally, an appropriate number of different, predefined protocols are permanently implemented in the vehicle controller in order to satisfy this requirement. For this purpose, the protocols for the controller are configured in the desired manner (in terms of the data identification and data representation) during the design phase of the associated data network system. Once the definition has been carried out in this way, the controller protocols for interchanging data can no longer be modified externally.

In view of these considerations, all the desired functionalities of the controller must conventionally, be defined in an early development phase. Any change to the functionality which is accompanied by a change to the protocols for the data interchange, and is implemented in a late development phase of a controller or after completion of its development, is linked with a high cost. Even minor differences between two controller functionalities require the development of two controllers, to take account of these differences, from the start.

It is furthermore known for vehicle controllers which can be coupled to a databus to be equipped with converters for signal communication via the respective databus, so that a controller can be variably coupled to different databus types, see, for example, German patent documents DE 41 40 803 A1 and DE 42 29 931 A1.

The invention is based on the technical problem of providing an electronic vehicle controller of the type mentioned initially, in which changes to protocols for interchanging data with other controllers via an appropriate databus can be implemented even during a late development phase or after completion of development of the controller, at low cost.

This and other objects and advantages are achieved by the electronic vehicle controller according to the invention, which contains a data protocol device situated between the processor unit and communication output stage. This protocol device variably defines the respective data protocol that is to be used at the moment for the data transfer, as a function of protocol control information, which is supplied to it, selecting from a predeterminable number of different data protocols. The functionality of this universal data protocol device can thus be modified via associated configuration control inputs to it, even at the end of the development process for the controller. Thus, its functionalities need not all be defined in an early development phase. Furthermore, data protocol changes which are required for a variant of an existing controller can be implemented by appropriately changing or reconfiguring the protocols in the data protocol device without necessity of developing the controller variant as a specific component, on its own.

In one embodiment of the invention the data protocol device contains a transmission block which can transpose data received from the processor unit via a specific number of data input channels, to a possibly different number of data output channels (using, for example a suitable transmission multiplexer stage), with the associated data protocol being variably adjustable. The data which may be emitted on a number of channels from the processor unit can thus be transposed using any desired protocol, to any required predetermined number of output channels, and can be passed on to the databus. In order to control data transmission in the downstream components, the transmission multiplexer stage emits a data transmission control signal, which is a function of the data protocol, at a control signal output.

In a further refinement, the transmission block of the data protocol device contains an overload protection unit, to which the data transmission control signal (which is a function of the data protocol) of the transmission multiplexer stage is supplied, and which passes this signal on (which may be modified) in such a manner that the downstream communication output stage is protected against an excessive number of transmission processes.

In another embodiment of the invention, the data protocol device contains a reception block of a design equivalent to that of the transmission block mentioned above. The reception block transposes data which arrive via data input channels on the bus side, to corresponding data output channels on the processor side, using a suitable data protocol. For this purpose, a reception multiplexer stage is provided which, inter alia, receives an associated data reception control signal. If the transmission block is also present, the universal data protocol device operates bidirectionally.

In a further refinement, the data protocol device contains an obsolescence unit in the reception block which receives the data reception control signal, and can use it to confirm the existence of a situation in which no more data is arriving, although such data is still expected. It then emits an appropriate information signal to the reception multiplexer stage.

According to another feature of the invention, the transmission and/or the reception block of the data protocol device contain a so-called history register (a shift register or buffer unit) which suppresses redundant transmission and/or reception processes. In the transmission block, there is in each case one history register per data input channel upstream of the transmission multiplexer stage. In the reception block, it is arranged downstream of the reception multiplexer stage, per data output channel. In a further refinement of the invention, the respective history register is assigned an assessment unit, which characterizes the amount of input data and contains any required selectable assessment functions.

A data protocol device according to the invention contains a so-called multimode timer which is assigned to the respective transmission and/or reception multiplexer stage and, as a function of the selected data protocol, produces a clock signal for cyclic transmission and/or reception of signals for the transmission and/or reception multiplexer stage. In this manner, cyclic transmission and reception are possible, without having to wait for a transmission and/or reception termination signal.

Other objects, advantages and novel features of the present invention will become apparent from the following detailed description of the invention when considered in conjunction with the accompanying drawings.

DETAILED DESCRIPTION OF THE DRAWING

Figure 1:
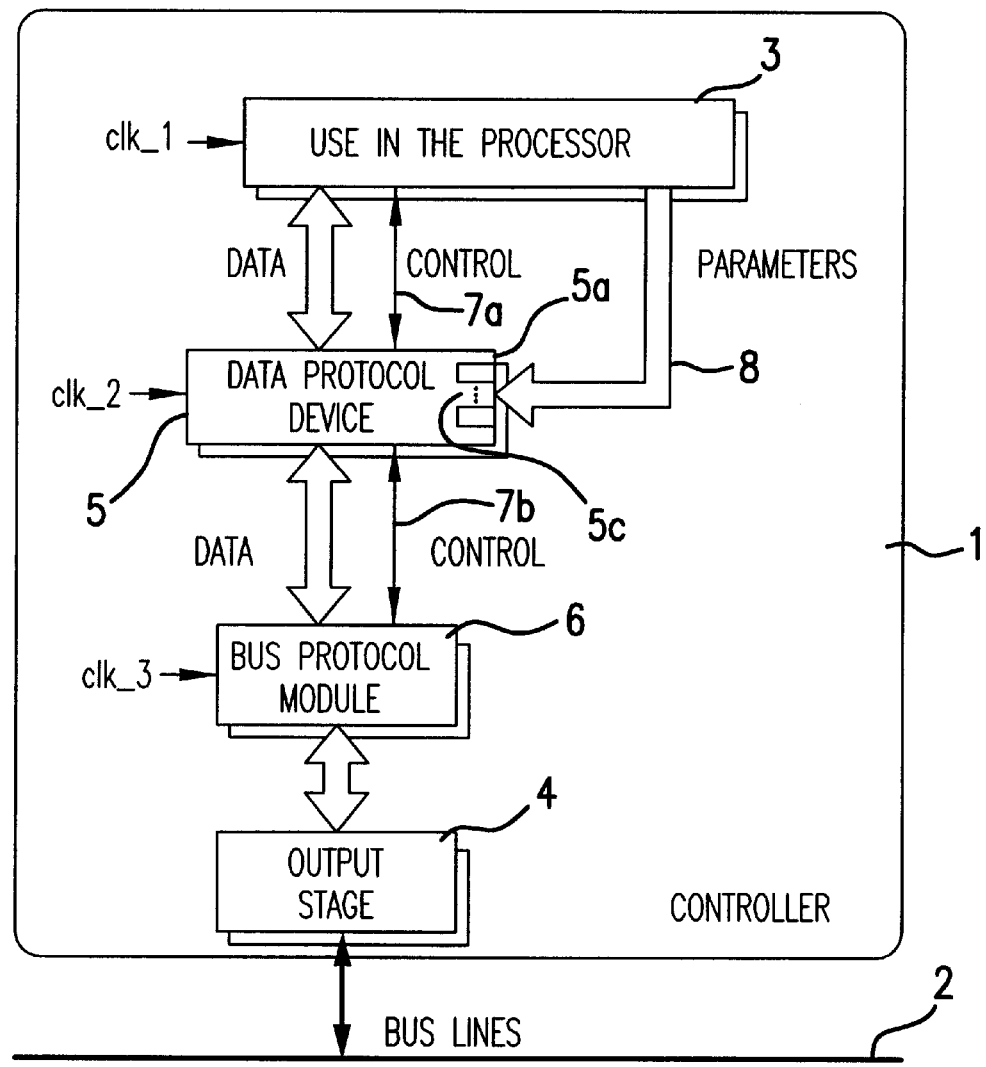
FIG. 1 shows a schematic block diagram of an electronic vehicle controller which can be coupled to a bus.

FIG. 1 is a schematic block diagram which shows an example of one of a number of controllers 1 in the electrical system of a motor vehicle, such as an automobile, including components that are of interest here. The controllers 1 are coupled to a common. databus 2, for example a CAN bus, and are thus networked with one another in order to interchange data via this bus 2. As its central unit, the controller 1 contains a microprocessor 3. A communication output stage 4 passes on data from the microprocessor 3 to the databus 2, receives data arriving via the bus 2 and intended for the relevant controller 1, and passes such data on to the processor unit 3. A data protocol device 5 and a bus protocol module 6 are connected in series between the processor unit 3 and the output stage 4 and can be controlled via associated control signals 7a, 7b from the processor unit 3. The processor unit 3, data protocol device 5 and bus protocol module 6 are clocked by respectively supplied clock signals clk_1, clk_2, clk_3. The bus protocol module 6 is of a conventional design, and therefore does not need to be described in any more detail here. Both the bus protocol module 6 and the data protocol device 5 between it and the processor unit 3 are designed to be bidirectional; that is, they allow a bidirectional data flow between the processor unit 3 and the databus 2, as indicated by corresponding arrows.

The data protocol device 5 is used to select and set, from among the plurality of available data protocols, a protocol which is suitable for the relevant data type, for a data set which is to be transmitted. To this end, it has a set of protocol control inputs 5c, via which appropriate configuration signals 8 can be entered which define the data protocol and, in the present example, are produced via the processor unit 3.

This capability to configure the data protocol device in order to change between different data protocols for the data to be transmitted means that the functionalities of the data protocol device 5, and thus of the controller 1 overall, need not all be defined in an early development phase. In fact, certain modifications can be implemented even in a late development phase or after completion of controller development, so that a change to the functionality does not necessitate complete redevelopment of a controller.

The settings and/or configuration changes carried out via the control inputs 5c remain in force even without any voltage supply. The following text describes in more detail the design and the functions of the data protocol device 5. The data protocol device 5 may optionally have autonomous transmission and reception timers, a predeterminable number of autonomous assessment functions, transmission and reception buffers as well as transmission enable, transmission confirmation and reception signalling.

Figure 2:
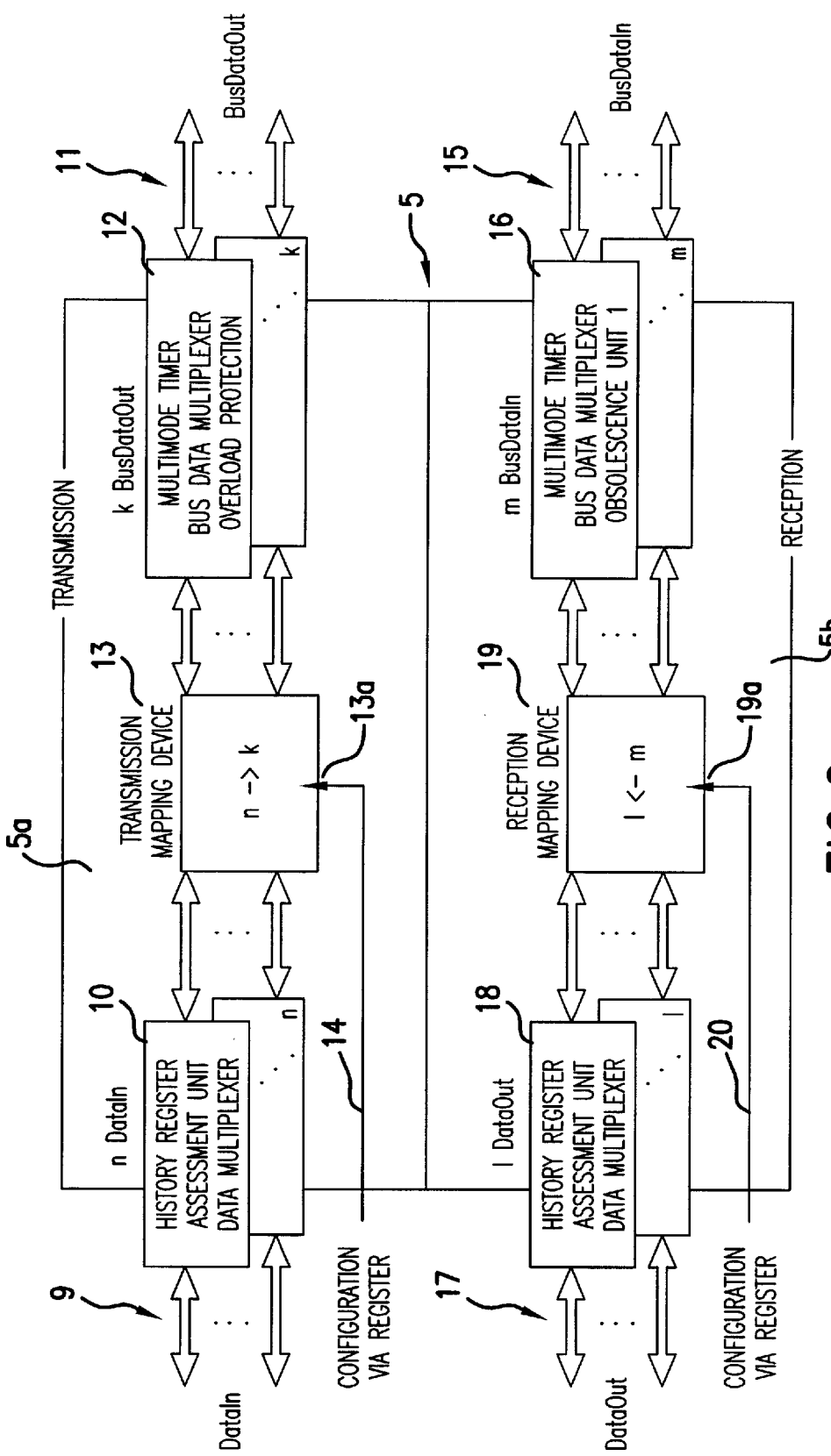
FIG. 2 shows a schematic block diagram of a data protocol device which is provided in the controller in FIG. 1.

As shown schematically in FIG. 2, the data protocol device 5 comprises a transmission block 5a and a reception block 5b. On the processor side (that is, linked to the processor unit 3), the transmission block 5a has a predeterminable number n of data input channels 9, each having an associated transmission input stage 10; and on the bus side (connected to the bus protocol module 6), it has a predeterminable number k of data output channels 11 each having an associated transmission output stage 12. A suitable transmission mapping device 13 is provided in a manner known per se, between the input stages 10 and the output stages 12 in order to transpose the data received from the microprocessor 3, via the n input channels 9, to the k output channels 11. The particular data protocol to be used by the transmission mapping device 13 at the moment can be configured via an associated control input 13a, by inputting an associated configuration command 14.

The reception block 5b has a design which corresponds to the transmission block 5a, with a predeterminable number m of data input channels 15 on the bus side, each having an associated reception input stage 16, a predeterminable number 1 of data output channels 17 on the processor side, each having an associated reception output stage 18. A reception mapping device 19, is interposed between the reception input stage 16 and the reception output stage 18, and implements a currently used data protocol, which can be set via a control input 19a by means of a supplied configuration signal 20. The processor-side output stages 10, 18 of the transmission block 5a and reception block 5b contain as essential components a history register, an assessment unit and a part (which is called a data multiplexer) of a respective transmission or reception multiplexer stage. The bus-side output stages 12, 16 of the transmission block 5a and reception block 5b primarily comprise a further part (which is called a bus data multiplexer) of the multiplexer stage, a multimode timer and an overload protection unit and/or an obsolescence unit, which will be described in more detail below.

Figure 3:
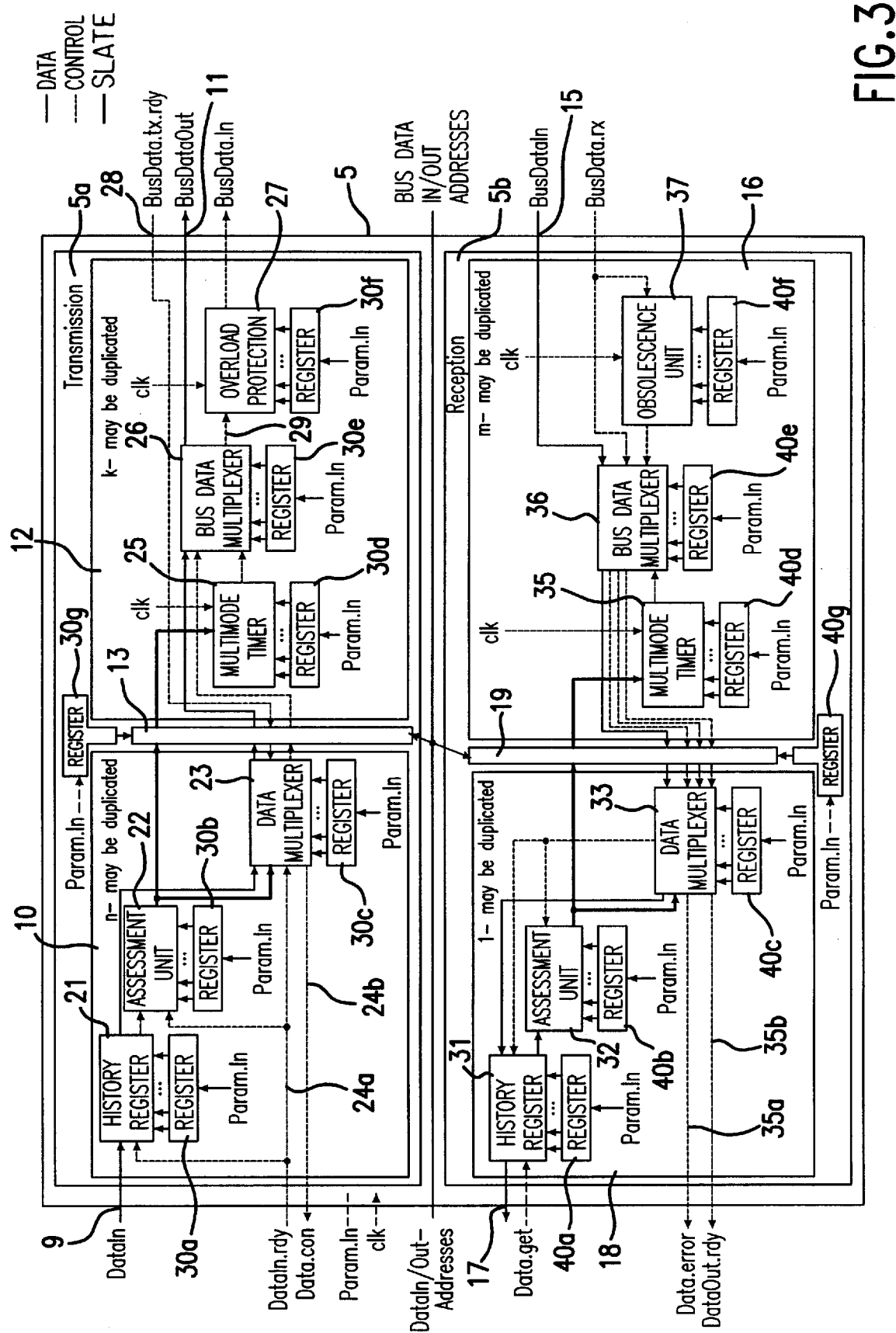
FIG. 3 shows a detailed block diagram of the data protocol device in FIG. 2.

FIG. 3 shows, in greater detail, the design of the transmission block 5a and of the reception block 5b of the data protocol device 5 for a data input channel and a data output channel, respectively. As can be seen, the respective input stage 10 of the transmission block 5a contains a history register 21, to whose input side the associated data input channel 9 is assigned, an assessment unit 22 for assessing incoming data transmitted from the history register 21, and a data multiplexer 23 to which the output signal from the assessment unit 22 and the data passed on from the history register 21 are supplied. Signals 24a, 24b which control data transmission are interchanged between the data multiplexer 23 and the processor unit 3, and indicate when a respective data transmission or data reception process has been completed.

The output stage 12 of the transmission block 5a contains a multimode timer 25, a bus data multiplexer 26 and an overload protection unit 27. The multimode timer 25 is supplied with an external clock signal clk, in the same way as other clocked components in the data protocol device 5. Furthermore, it can be controlled by the output signal from the assessment unit 22, and thus as a function of the content of the data transferred. The bus data multiplexer 26 emits via the associated data output channel 11 data passed to it from the data multiplexer 23, while an acknowledgement signal 28 arriving on the bus side and relating to a completed data transmission process is passed on from the output stage 12 to the data multiplexer 23 of the input stage 10. The overload protection unit 27 processes a data transmission control signal 29 arriving from the bus data multiplexer 26, which signal 29 indicates completion of a respective transmission process for the downstream components, so that these downstream components are still protected against an excessive number of transmission processes. In order to generate this data transmission control signal 29, the bus data multiplexer 26 receives associated control signals from the data multiplexer 23 and from the multimode timer 25.

The transmission mapping device 13 ensures correct data transfer between the transmission input stage 10 and the transmission output stage 12. Each of the transmission block components mentioned is assigned a respective control data register 30a to 30g, which can be selected by a configuration control data set param.in, by which means the operation of the relevant components is set to a data protocol which is thus respectively selected.

The input stage 16 on the bus side and the output stage 18 on the processor side of the respective reception block 5b have a structure corresponding essentially and respectively to the output stage on the bus side and the input stage on the processor side of the transmission block 5a. The output stage 18 on the processor side thus contains a history register 31, an assessment unit 32 and a data multiplexer 33, while the input stage on the bus side has a multimode timer 35, a bus data multiplexer 36 and an obsolescence unit 37. The reception mapping device 19 controls the data transfer between the input stage 16 on the bus side and the output stage 18 on the processor side of the reception block 5b. Each of these units is once again assigned a respective register 40a to 40e, which can be selected, for configuration in accordance with the respectively desired data protocol.

Data (BusDataIn) arriving on the bus side of reception block 5b are passed to the bus data multiplexer 36 and from there, via the reception mapping device 19 and the data multiplexer 33, to the history register 31 on the output side, from which they are passed on via the associated data output channel 17 to the processor unit. The multimode timer 35 controls the bus data multiplexer 36 in a suitable manner. For its part, it is controlled as a function of the data contained in the history register 31. The data multiplexer 33 is controlled by the output signal from the assessment unit 32. An incoming data reception control signal BusData.rx is supplied in parallel to the bus data multiplexer 36 and to the obsolescence unit 37. The latter confirms when no more data is arriving although such data is still expected, and emits an appropriate output signal to the bus data multiplexer 36. On the output side, the data multiplexer 33 emits control signals 35a, 35b to the microprocessor, and these control signals provide information about any transmission error and/or completion of a data output process.

The history registers 21, 31, which are used to provide the previous knowledge about the data to be transmitted, have a trigger input and can be implemented in a conventional manner as clocked shift registers. In conjunction with the associated assessment unit 22, 32, it is thus possible to take account of the previous history for a data transfer while it is taking place, in order for example, to pass on data only when it has been changed in order to suppress redundant data transmissions. (Optionally, this functionality may be dispensed with.)

The configuration registers 30a to 30g and 40a to 40g which are assigned to the individual components allow the selection of predetermined functions and initialization of each component on start-up. Typically, these registers 30a to 30g and 40a to 40g consist of non-volatile memories which can be selected. Apart from this, the flow of data signals and control signals in FIG. 3 is self-explanatory.

Figure 4:
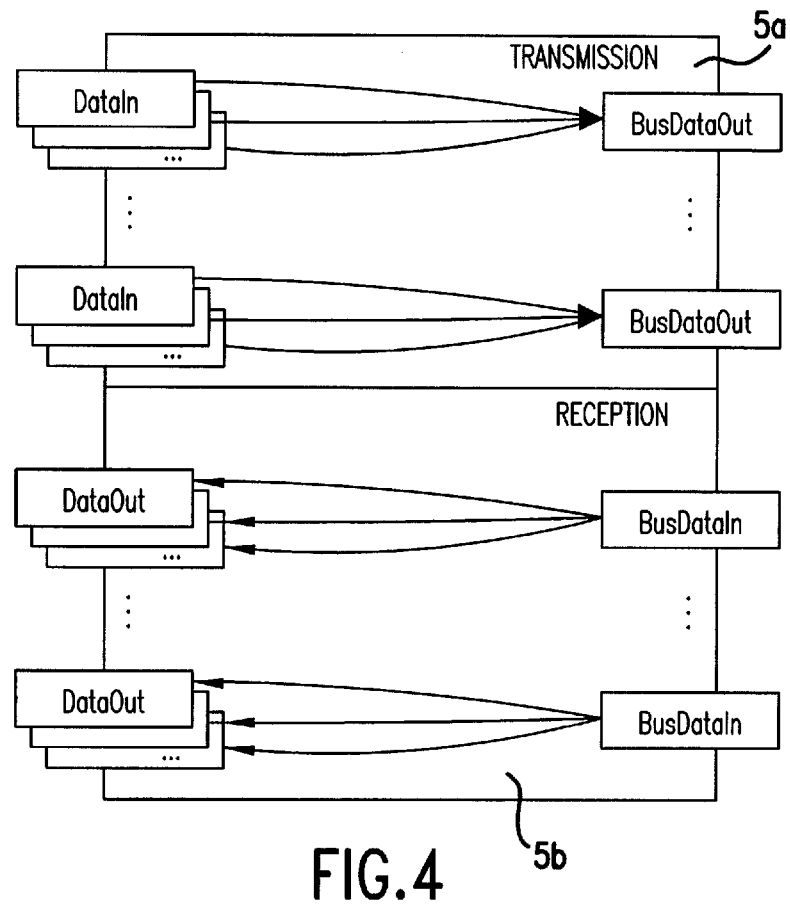
FIG. 4 shows a schematic block diagram of the data protocol device which illustrates the capability to duplicate data input channels and output channels.

The respective input stages 10, 16 and output stages 12, 18 of the transmission block 5a and the reception block 5b can be duplicated the desired number of times n, m; k, l, corresponding to the number of data input and data output channels 9, 15; 11, 17. As is shown schematically in FIG. 4, this allows one or more maps to be formed of data, supplied on the processor side via a plurality of input channels DataIn, in the transmission block 5a on to a respective output channel BusDataOut on the bus side. In a corresponding manner in the reception block 5b, the data arriving from the databus via a respective input channel BusDataIn on the bus side can be mapped on to a plurality of output channels DataOut on the processor side.

The universal, bidirectional data protocol device 5 described above allows the selection of a respective data transmission and reception modes from among a set of predetermined modes by the relevant multimode timer with automatic initialization, such as synchronous transmission and reception or asynchronous transmission and reception, preventative communication overload protection, automatic obsolescence monitoring, selection of data content assessment logic from a set of logic functions which can be predetermined by the assessment unit, as well as, optionally, reception signalling and transmission request production. FIGS. 5 to 12 show in greater detail components in the data protocol device 5. It should be noted in this regard that all the components of the controller 1 may be implemented in the form of hardware and/or software.

Figure 5:
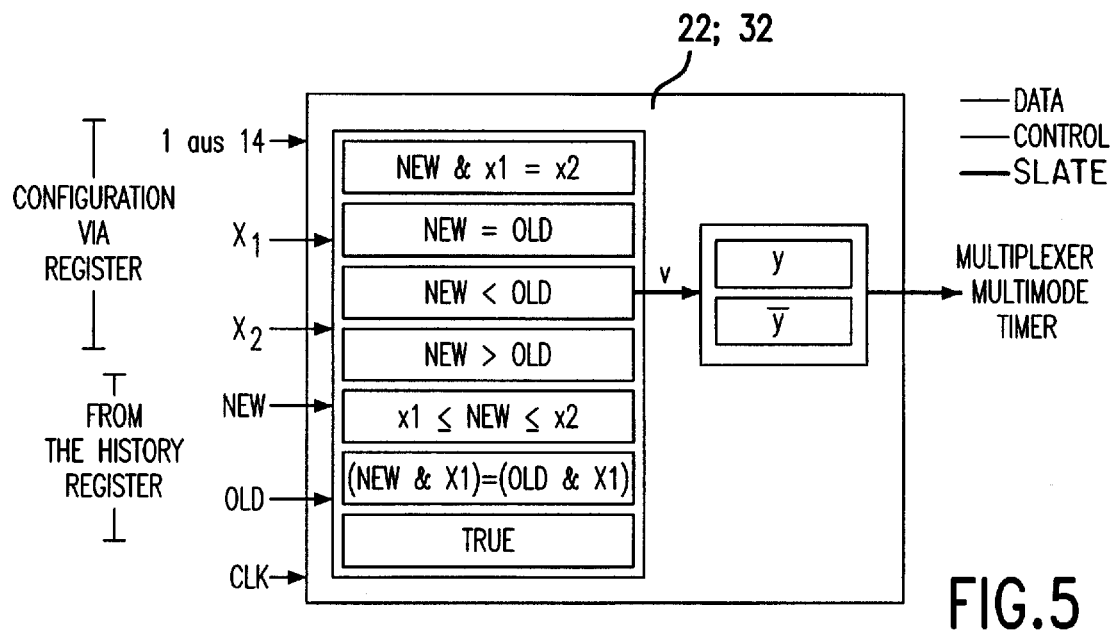
FIG. 5 is a block diagram of an assessment unit contained in the data protocol device.

FIG. 5 shows the design of the assessment units 22, 32 used, the illustration essentially being self-explanatory. The assessment logic to be used is set via configuration inputs in accordance with selection commands from the associated register that configures the data protocol. Newly arriving data "new" is accordingly compared with previously arrived data "old" from the associated history register for a match, and an appropriate state signal y is produced and is passed on to the multiplexer stage as well as to the multimode timer.

Figure 6:
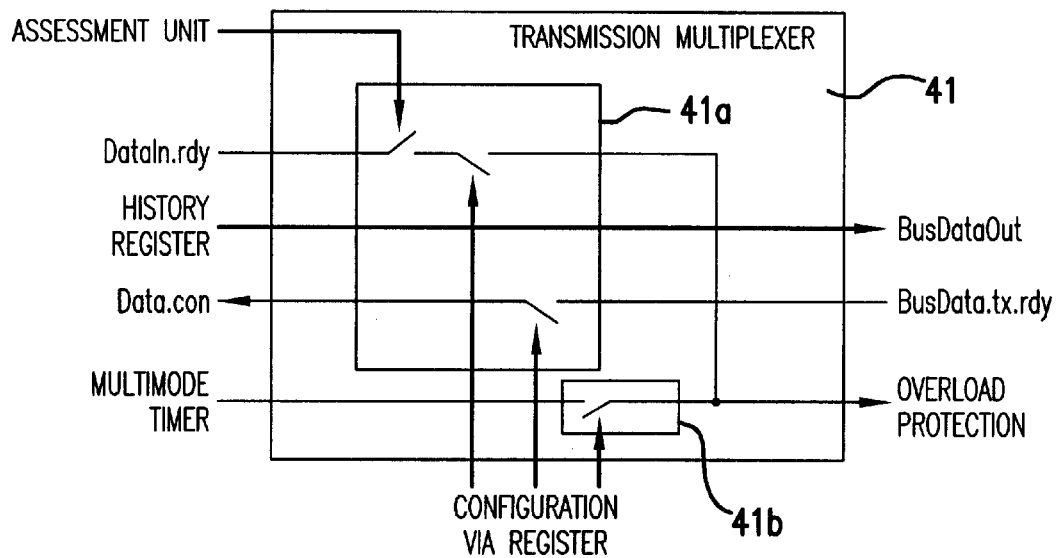
FIG. 6 shows a block diagram of a transmission multiplexer stage contained in the data protocol device.

FIG. 6 shows the transmission multiplexer stage 41, which is composed of the data multiplexer 23 and the bus data multiplexer 26 of a respective input stage 10 and output stage 12 of the transmission block 5a. As shown, this transmission multiplexer stage 41 contains a plurality of switching elements which can be selected and which can be switched on or off by the data state output signal from the assessment unit and/or by the configuration commands which set the data protocol, from the associated configuration register. Depending on the position of these switching elements (i) the transmission completion signal Bus-Data.tx.rdy supplied on the bus side is or is not passed on as the corresponding data control signal Data.con to the processor unit, and (ii) the appropriate bus data transmission control signal is produced from the signal supplied from the multimode timer or the data input completion signal DataIn.rdy, and is passed on to the overload protection unit. In this case, the illustrated transmission multiplexer 41 also contains the mapping mechanism for the transmission mapping device. The transmission multiplexer stage 41 controls the data flows and control signal flows, including the addressing, in a manner which is known per se. In the illustrated embodiment, the multiplexer stage 41 is able to switch over between synchronous and asynchronous transmission. The one outlined multiplexer part 41a can be duplicated per data channel on the processor side and per data channel on the bus side, while the other outlined multiplexer part 41b can be duplicated per data channel on the bus side.

Figure 7:
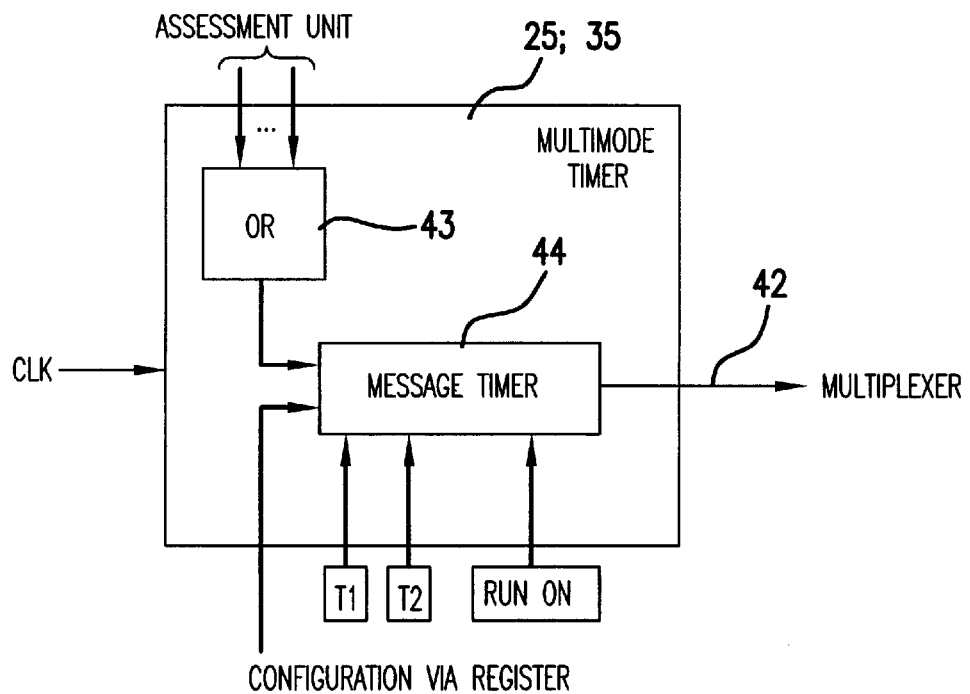
FIG. 7 shows a block diagram of a multimode timer contained in the data protocol device in FIG. 3.

FIG. 7 shows the structure of the multimode timer 25, 35. This multimode timer unit produces at least one trigger signal 42 for the associated multiplexer stage and has a clock input clk which is used as a time base, or, alternatively, has an internal time base. The multimode timer 25, 35 for a respective data channel on the bus side receives, at an OR gate 43, the state output signals from the assessment units of the various data channels on the processor side. The output signal from the OR gate 43 is supplied to a message timer 44 which, in parallel with this, receives configuration commands, which are a function of the data protocol, from the associated data protocol configuration register. The multimode timer 25, 35 has two modes with two different cycle times T1, T2, which can be selected as parameters. Furthermore, a run on may be configured. Alternatively, more than two modes may be implemented in the multimode timer, in which case it typically contains switchable, cyclic timers.

Figure 8:
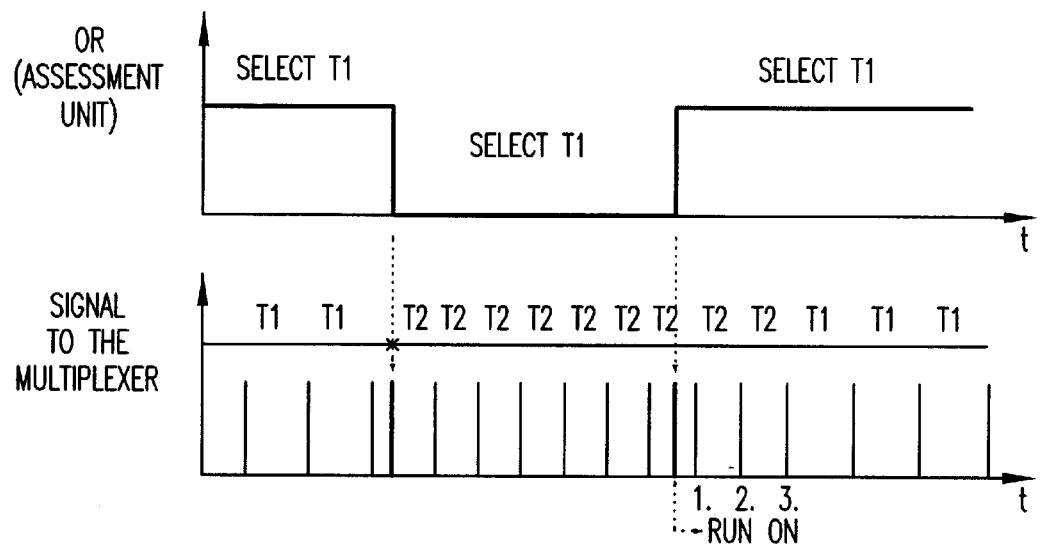
FIG. 8 shows a signal waveform diagram which illustrates a first mode of the multimode timer.
Figure 9:
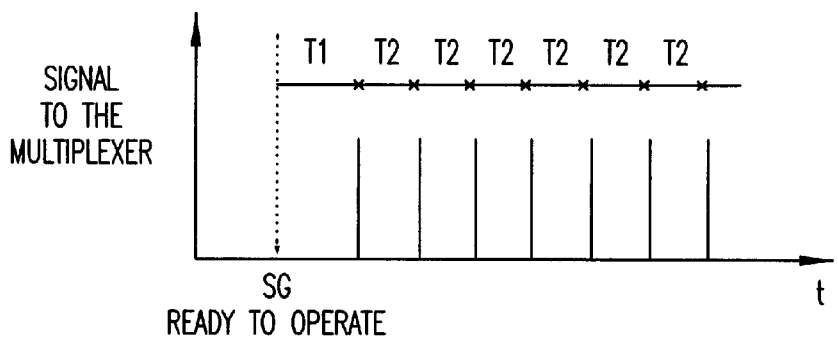
FIG. 9 shows a signal waveform diagram to illustrate a second mode of the multimode timer.

FIGS. 8 and 9 show two modes of the multimode timer 25, 35 in the form of a diagram. FIG. 8 shows a first mode, which represents a cyclic message timer with run on. In this case, the two typical time parameters T1 and T2 are both chosen to be greater than 0. The choice between the two time parameters T1 and T2 as the respective applicable cycle time is made by means of the output signal from the OR gate 43. The upper of the two diagrams in FIG. 8, whose timings are equivalent and which lie one above the other, shows the output signal from the OR gate 43, while the lower diagram shows the trigger signal 42 supplied to the multiplexer. When the output signal from the OR gate 43 changes to its level associated with the time parameter T1, the trigger signal remains at the previous clock level T2 for the chosen run-on repetition factor of, for example, three, in order then to change to the new clock level T1.

The second mode, illustrated in FIG. 9, is a cyclic message timer without any run on. In this case, it is once again possible to choose between two time parameters T1 and T2. The parameter T1 defines the delay before the cyclic transmission of a message starts, and this is then carried out using the cycle time T2. In contrast, the trigger signal 42 changes from the cycle clock T1 to the cycle clock T2 without any delay when the output signal from the OR gate 43 changes to the level associated with the time parameter T2.

Figure 10:
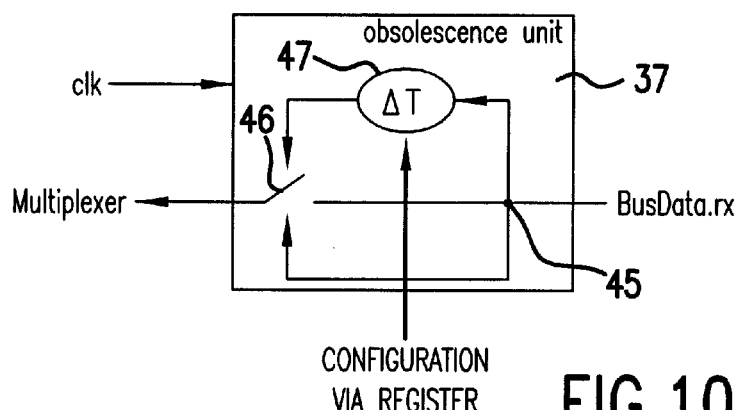
FIG. 10 shows a block diagram of an obsolescence unit contained in the data protocol device.

FIG. 10, which shows the structure of the respective obsolescence unit 37, is largely self-explanatory. As in the other figures, the thin lines represent control signals, and the thick lines represent data signals or state signals. The obsolescence unit 37 contains a branching node 45, which can be regarded as a driver, as well as a changeover switch 46, which can be regarded as a logic gate. A schematically shown time delay unit 47 is typically in the form of a shift register or a counter, and can be set via the configuration signals, which are a function of the data protocol, from the associated configuration register. The associated multiplexer stage is supplied with the output signal (respectively selected by the changeover switch 46) from the obsolescence unit 37. The obsolescence unit 37 designed in this way indicates when data have not been updated for an excessively long time, that is to say it monitors the time associated with the data reception processes.

Figure 11:
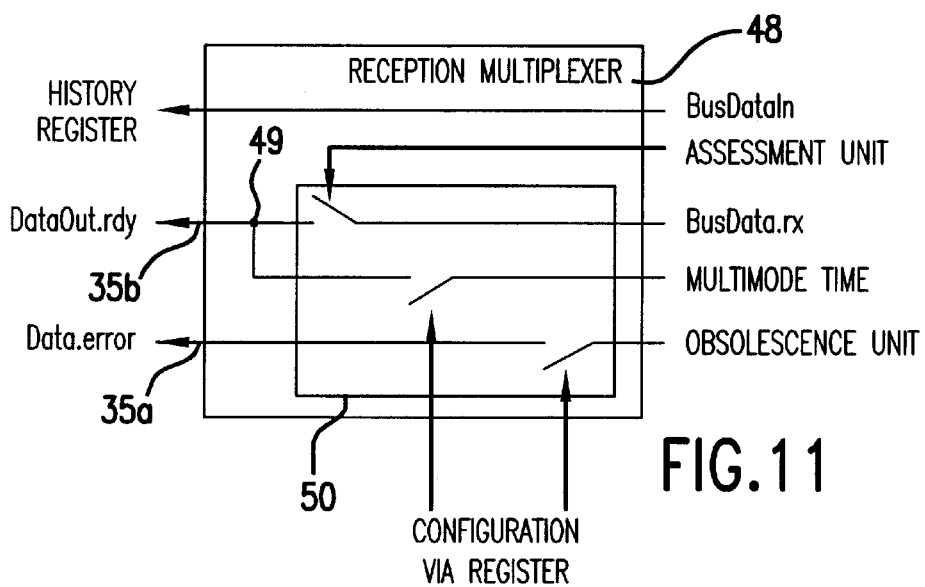
FIG. 11 shows a block diagram of a reception multiplexer stage contained in the data protocol device.

FIG. 11 shows the structure of a reception multiplexer stage 48 in the reception block 5b, which reception multiplexer stage 48 combines the data multiplexer 33 and the bus data multiplexer 36 together with the associated reception mapping device 19. The structure of this reception multiplexer 48 is essentially analogous to that of the transmission multiplexer 41 in FIG. 6, so that reference can be made to the description there. The junction point 49 shown in this case represents a logic OR gate, while the selectable switching elements are typically implemented as logic AND gates. The reception multiplexer stage 48 is able to switch between synchronous reception and asynchronous reception. With appropriate configuration, the reception multiplexer stage 48, in contrast to the function of the transmission multiplexer stage 41, passes on the output signal (which may indicate a transmission error) from the obsolescence unit as a fault signal to the processor unit. The outlined multiplexer part 50 may be duplicated per data channel on the processor side and per data channel on the bus side. The reception multiplexer 48 breaks down the BusDataIn arriving on the input side into different parts, and sends these parts to the correct history registers.

Figure 12:
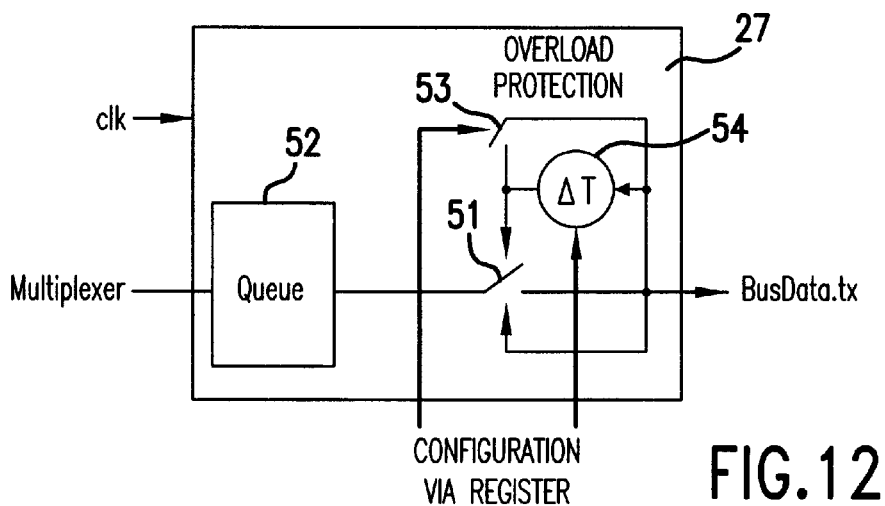
FIG. 12 shows a block diagram of an overload protection unit contained in the data protocol device.

FIG. 12 shows the structure of the overload protection unit 27. In this case, nodes once again represent driver units, while the illustrated switching element 51 can be regarded as a logic AND gate. A queuing unit 52 on the input side, to which the associated multiplexer output signal is supplied, is formed, for example, by a FIFO memory. A further switching element 53 as well as a time delay element 54 can be selected by the configuration commands, which define the data protocol, from the associated configuration register, in order to set the correct time intervals for the data to be transmitted and, in this way, to form the corresponding transmission control signal BusData.tx.

The data protocol device to be used according to the invention may be implemented with its associated units as an ASIC, IC or other logic circuit in hardware or software, discretely or in integrated form. Depending on the application, in the exemplary embodiment shown, individual interfaces or modules of the illustrated data protocol device may be omitted. The vehicle controller equipped according to the invention with such a data protocol device can be used flexibly in vehicle electronics in terms of the different types of data that occur, while retaining the capability to define the protocol even after completion of controller development. In comparison with the conventional technique, it is thus possible to avoid the provision of different, only slightly modified, controller variants, thus leading to advantages in terms of logistics and spares stockholding.

Furthermore, controllers for prototype vehicles and for laboratory construction can be generated at low cost, since the data protocols can be selected and configured very easily. The controllers can easily be matched to specific intended vehicles at the end of the production line so that, for example, the same controller can be used for different vehicle models. Avoiding any definition of the data protocols until towards the end of controller development obviates the need for component suppliers to carry out protocol adaptation measures. Since the controller response can be manipulated from the outside, optimized tests can be carried out, so that it is also possible to assist fault analysis in the area of release investigation and goods-inwards testing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic vehicle controller comprising:
   a processor unit;
   a communication output stage for coupling the controller to a databus; and
   a data protocol device connected between the processor unit and the communication output stage; wherein
   said data protocol device variably sets a data protocol to be used for a respective data transfer, as a function of protocol control information which is supplied as an input to said data protocol device; and
   the data protocol device comprises
   a transmission block having a predeterminable number of data input channels on a processor unit side thereof, a predeterminable number of data output channels on a bus side thereof, and means for transposing data from the input channels to the output channels, which means include a transmission multiplexer stage that emits at least one data transmission control signal as a function of a set data protocol; and
   a reception block having a predeterminable number of data input channels on a bus side thereof, a predeterminable number of data output channels on a processor side thereof, and means for transposing data from the input channels to the output channels, which means includes a reception multiplexer stage that emits at least one data transmission control signal as a function of the data protocol.

2. The electronic vehicle controller according to claim 1, further comprising an overload protection unit which processes the data transmission control signal in order to prevent an excessive number of transmissions.

3. The electronic vehicle controller according to claim 1, wherein the data protocol device comprises:
   a reception block having a predeterminable number of data input channels on a bus side thereof;
   a predeterminable number of data output channels on a processor side thereof; and
   means for transposing data from the input channels to the output channels, which means includes a reception multiplexer stage which emits at least one data transmission control signal as a function of the data protocol.

4. The electronic vehicle controller according to claim 1, further comprising an obsolescence unit for monitoring time associated with data reception processes based on a data reception control signal which is supplied on the bus side.

5. The electronic vehicle controller according to claim 1, wherein at least one of the transmission block and the reception block has a data-buffering register unit per data channel on the processor side.

6. The electronic vehicle controller according to claim 1 wherein at least one of the transmission block and the reception block has a data-buffering register unit per data channel on the processor side.

7. The electronic vehicle controller according to claim 5 wherein at least one of the transmission block and the reception block contains an assessment unit for assessing the status of data, which assessment unit is connected downstream of the respective register unit and whose output signal is supplied to the multiplexer stage.

8. The electronic vehicle controller according to claim 1, wherein at least one of the transmission block and the reception block contains a multimode timer per data channel on the bus side, which multimode timer produces a mode-specific clock signal for the associated multiplexer stage.

9. The electronic vehicle controller according to claim 1 wherein at least one of the transmission block and the reception block contains a multimode timer per data channel on the bus side, which multimode timer produces a mode-specific clock signal for the associated multiplexer stage.

10. An electronic vehicle controller, comprising:
    a processor unit;
    communication output stage for coupling the controller to a databus; and
    a data protocol device connected between the processor unit and the communication output stage; wherein,
    said data protocol device variably selects a data protocol to be used for data communication between the processor unit and the databus, as a function of a type of data which is currently being transferred, in response to protocol control information which is supplied as an input -to the data protocol device; and
    said processor unit communicates said protocol control information to said data protocol device in the form of configuration signals which define a data protocol to be implemented.

11. The electronic vehicle controller according to claim 1, wherein said processor unit communicates said protocol control information to said data protocol device in the form of configuration signals which define a data protocol to be selected.

* * * * *